United States Patent
Pelstring et al.

(10) Patent No.: US 6,679,501 B1
(45) Date of Patent: Jan. 20, 2004

(54) MOTOR WITH STATIONARY SHAFT AND HIGH SPEED CAPILLARY SEAL

(75) Inventors: Robert M. Pelstring, Santa Cruz, CA (US); Raquib U. Khan, Pleasanton, CA (US); Klaus Kloeppel, Watsonville, CA (US); Alan L. Grantz, Aptos, CA (US); Norbert S. Parsoneault, Scotts Valley, CA (US); Marten F. Byl, Los Gatos, CA (US); Hans Leuthold, Santa Cruz, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/489,450

(22) Filed: Jan. 21, 2000

Related U.S. Application Data

(60) Provisional application No. 60/119,776, filed on Feb. 11, 1999, provisional application No. 60/116,776, filed on Jan. 22, 1999, and provisional application No. 60/116,830, filed on Jan. 22, 1999.

(51) Int. Cl.$^7$ .............................. F16J 15/40; F16J 15/43; F16C 32/06; F16C 33/22; G11B 17/08
(52) U.S. Cl. .................. 277/409; 277/410; 277/301; 384/114; 384/125; 384/126; 360/97.02; 360/98.07; 360/121
(58) Field of Search .................. 277/301, 302, 277/303, 304, 409, 410, 431, 423, 425, 424, 427, 428, 429; 384/101, 100, 114, 625, 125, 126; 360/99.08, 98.07, 97.02, 119, 121

(56) References Cited

U.S. PATENT DOCUMENTS

| | | | |
|---|---|---|---|
| 4,357,021 A | * | 11/1982 | Raj et al. |
| 4,455,026 A | * | 6/1984 | Pinkus et al. |
| 4,527,802 A | * | 7/1985 | Wilcock |
| 4,565,379 A | * | 1/1986 | Ballhaus |
| 4,605,233 A | * | 8/1986 | Sato |
| 4,673,997 A | | 6/1987 | Gowda et al. |
| 4,890,850 A | * | 1/1990 | Raj et al. |
| 4,898,480 A | | 2/1990 | Raj et al. |
| 5,367,416 A | | 11/1994 | Cossette et al. |
| 5,454,724 A | | 10/1995 | Kloeppel et al. |
| 5,536,088 A | | 7/1996 | Cheever et al. |
| 5,558,445 A | | 9/1996 | Chen et al. |
| 5,683,183 A | * | 11/1997 | Tanaka et al. |
| 5,694,272 A | | 12/1997 | Bang |
| 5,770,906 A | | 6/1998 | Hazelton et al. |
| 5,801,464 A | | 9/1998 | Brezoczky |
| 5,806,987 A | | 9/1998 | Nose et al. |
| 5,818,133 A | * | 10/1998 | Kershaw et al. .............. 310/64 |
| 5,886,854 A | | 3/1999 | Diaz et al. |
| 5,969,448 A | * | 10/1999 | Liu et al. .................. 310/67 R |
| 5,980,113 A | * | 11/1999 | Grantz |
| 6,020,664 A | * | 2/2000 | Liu et al. |
| 6,154,339 A | * | 11/2000 | Grantz et al. |
| 6,290,233 B1 | * | 9/2001 | Yamamura et al. ......... 277/410 |

* cited by examiner

Primary Examiner—Anthony Knight
Assistant Examiner—Vishal Patel
(74) Attorney, Agent, or Firm—Moser, Patterson & Sheridan, LLP

(57) ABSTRACT

A motor or bearing which incorporates the use of a capillary seal adjacent a bearing race between the shaft and surrounding hub or housing. The seal may take a plurality of forms, including a straight capillary seal; a seal formed between the housing and a seal ball having different radius of curvatures (preferably with the housing internal surface having a larger radius); or a centrifugal capillary seal comprising a male cone supported on a fixed or rotating shaft, and a female cone supported on a housing.

The use of a capillary seal rather than ferrofluid seal should also provide a reduction in resistance across the seal gap compared to a ferrofluid seal.

6 Claims, 9 Drawing Sheets

MOTOR WITH STATIONARY SHAFT AND HIGH SPEED CAPILLARY SEAL

CROSS REFERENCE TO RELATED APPLICATIONS

This application claims priority to U.S. Provisional Patent Application Ser. No. 60/116,776 filed Jan. 22, 1999, U.S. Provisional Patent Application Ser. No. 60/116,830 filed Jan. 22, 1999, and U.S. Provisional Patent Application Ser. No. 60/119,776 filed Feb. 11, 1999 and as assigned to the assignee of this application; the priority of these provisional applications is hereby claimed.

FIELD OF THE INVENTION

The present invention relates generally to the field of disc drives, and more particularly to an apparatus and method for providing a reliable, ferrofluidic seal between a hub and a stationary shaft; the design is especially useful in a high speed spindle motor in a disc drive.

BACKGROUND OF THE INVENTION

Disc drives, including magnetic disc drives, optical disc drives and magneto-optical disc drives, are widely used for storing information. A typical disc drive has one or more discs for storing information in a plurality of concentric circular tracks. This information is written to and read from the discs using read/write heads mounted on actuator arms which are moved from track to track across surfaces of the discs by an actuator mechanism. The discs are mounted on a spindle which is turned by a spindle motor to pass the surfaces of the discs under the read/write heads. The spindle motor generally includes a shaft fixed to a baseplate and a hub, to which the spindle is attached, having a sleeve into which the shaft is inserted. Permanent magnets attached to the hub interact with a stator winding on the baseplate to rotate the hub relative to the shaft. One or more bearings between the hub and the shaft facilitate rotation of the hub.

The spindle motor also typically includes an exclusion seal to seal interfacial spaces between the hub and the shaft. This is necessary, because lubricating fluids or greases used in the bearings tend to give off aerosols or vaporous components that migrate or diffuse out of the spindle motor and into a disc chamber in which the discs are maintained. This vapor often transports other particles, such as material abraded from the bearings or other components of the spindle motor, into the disc chamber. These vapors and particles deposit on the read/write heads and the surfaces of the discs, causing damage to the discs and the read/write heads as they pass over the discs. Thus, the migration of these contaminants into the disc chamber must be prevented.

To prevent the migration of these contaminants into the disc chamber, the latest generation of spindle motors utilize a ferrofluidic seal between the shaft and the hub. Ferrofluidic seals are described in, for example, U.S. Pat. No. 5,473,484, which is incorporated herein by reference. A typical ferrofluidic seal consists of a ferrofluid, an axially polarized annular magnet and two magnetically permeable annular pole pieces attached to opposing faces of the magnet. The ferrofluid is conventionally composed of a suspension of magnetically permeable particles suspended in a fluid carrier. Generally, the magnet and the pole pieces are fixed to the hub and extend close to but do not touch the shaft. Magnetic flux generated by the magnet passes through the pole pieces and the shaft, which is also magnetically permeable, to magnetically hold the ferrofluid in magnetic gaps between the pole pieces and the shaft, thereby forming a seal.

Current design concepts for high speed ferrofluid seals (above 13K RPM) have a rotating magnetic seal with a ferrofluid liquid between the seal and a fixed shaft. The centrifugal forces developed under high speed operation exceed the ability of the seal magnetic flux to hold the ferrofluid against the shaft due to the velocity gradient across the ferrofluid, resulting in the failure of the ferrofluid to maintain a hermetic seal.

Accordingly, there is a need for a design that seals an outer surface of a shaft to an inner surface of a hub disposed about the shaft. It is desirable that the seal provide a structure that is reliable at high rotational speeds. It is also desirable that a method for forming such a ferrofluidic seal not increase manufacturing time or costs for assembling a spindle motor in which the seal is used.

In addition, the seal conductivity of ferrofluid seals is becoming marginal (>150 Mohms) for high performance drives.

The present invention provides a solution to these and other problems, and offers other advantages over the prior art.

SUMMARY OF THE INVENTION

The present invention relates to an apparatus for sealing the outer surface of a shaft to an inner surface of a hub disposed about the shaft that solves the above problems.

In summary, the present invention contemplates the use of a capillary seal adjacent a bearing race between the shaft and surrounding hub or housing. The seal may take a plurality of forms, including a straight capillary seal; a seal formed between the housing and a seal ball having different radius of curvatures (preferably with the housing internal surface having a larger radius); or a centrifugal capillary seal comprising a male cone supported on a fixed or rotating shaft, and a female cone supported on a housing.

The use of a capillary seal rather than ferrofluid seal should also provide a reduction in resistance across the seal gap compared to a ferrofluid seal.

DETAILED DESCRIPTION

Figure 1:
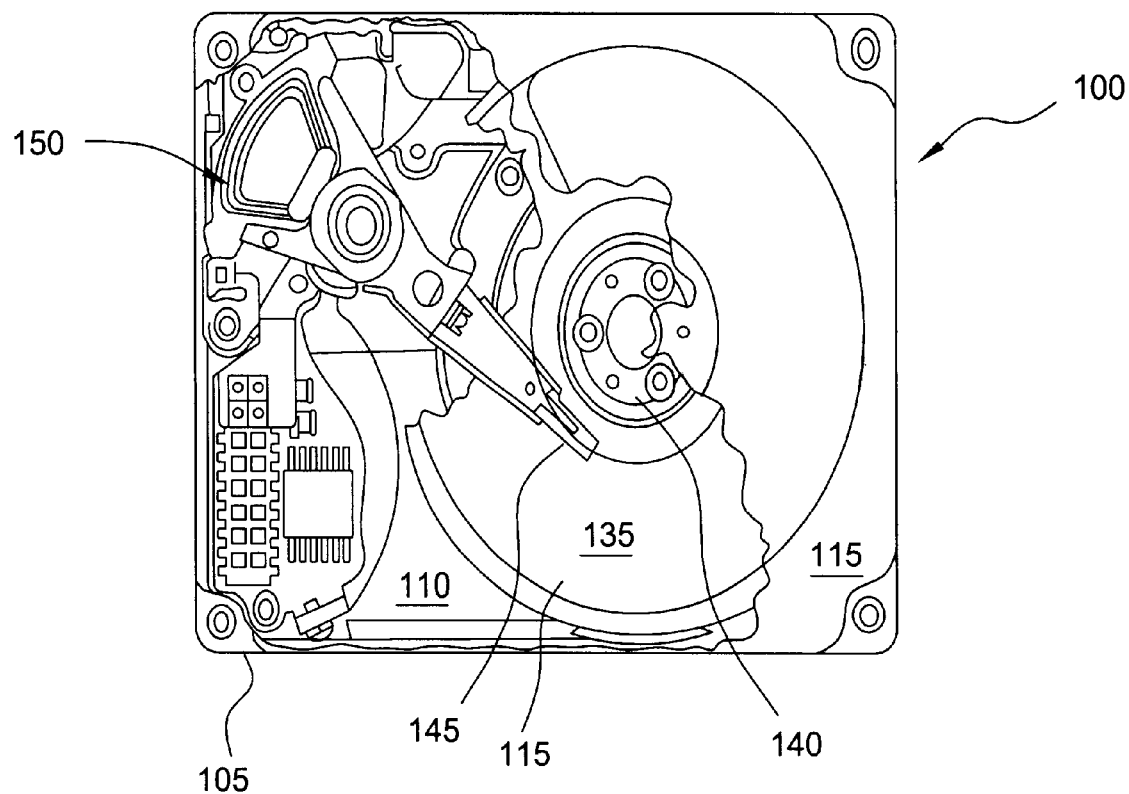
FIG. 1 is a plan view of a disc drive in which a spindle motor incorporating a ferrofluidic seal according to the embodiment of the present invention is especially useful.

FIG. 1 is a plan view of a magnetic disc drive for which a spindle motor having a seal according to the present invention is particularly useful. Referring to FIG. 1, a disc drive 100 typically includes a housing 105 having a base 110 joined to a cover 115. One or more of discs 130 having surfaces 135 covered with a magnetic media (not shown) for magnetically storing information are attached to a spindle 140. A spindle motor (not shown in this figure) turns the spindle 140 to rotate the discs 130 past read/write heads 145 which are suspended above surfaces 135 of the discs by a suspension arm assembly 150. In operation, the discs 130 are rotated at high speed past the read/write heads 145 while the suspension arm assembly 150 moves the read/write heads in an arc over a number of radially spaced tracks (not shown) on the surfaces 135 of the discs 130. Thus, the read/write heads 145 are enabled to read and write magnetically encoded information to the magnetic media on the surfaces 135 of the discs 130 at selected locations.

Figure 2:
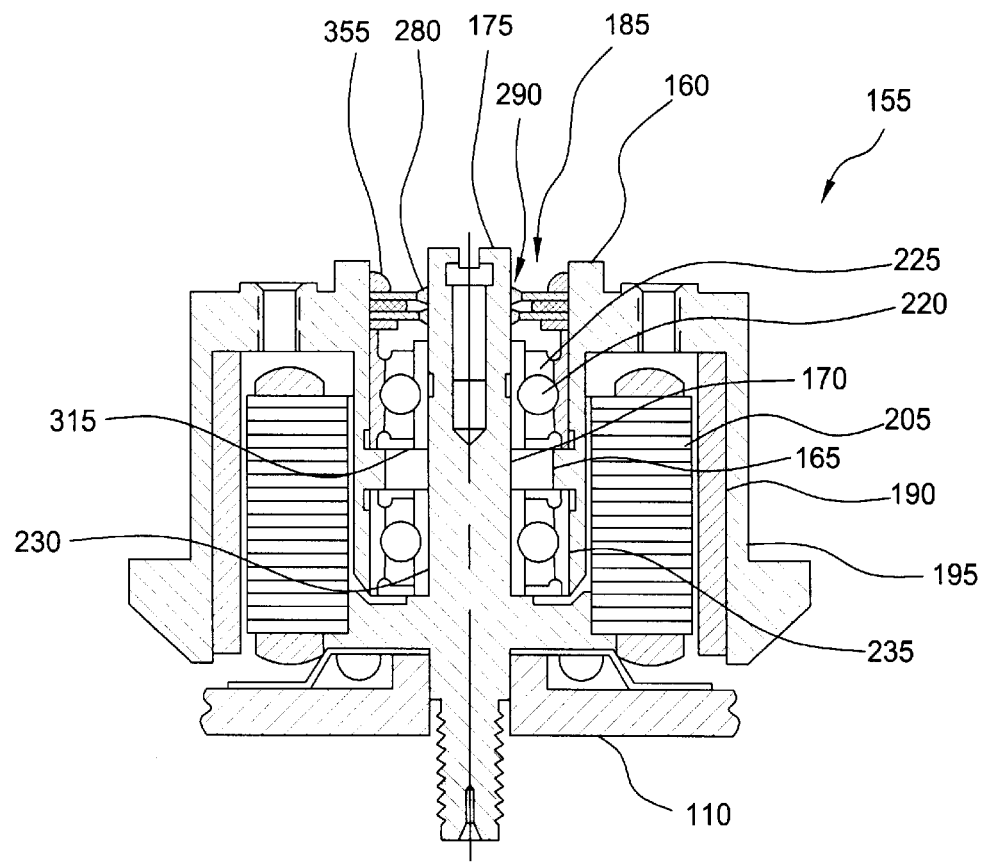
FIG. 2 is a sectional side view of an embodiment of a spindle motor in which the present invention is useful illustrating a ferrofluidic seal according to the prior art.

FIG. 2 is a sectional side view of a spindle motor 155 of a type which is especially useful in disc drives 100. Typically the spindle motor 155 includes a rotatable hub 160 having an inner surface 165 disposed about an outer surface 170 of a shaft 175. A ferrofluidic seal 185 according to the present invention seals and electrically connects the outer surface 170 of the shaft 175 to the inner surface 165 of the hub 160. One or more magnets 190 attached to a periphery 195 of the hub 160 interact with a stator winding 205 attached to the base 110 to cause the hub 160 to rotate. The hub 160 is supported on the shaft 175 by one or more ball bearings 215. A ball bearing generally includes one or more balls 220 loosely held by a retainer 225 between an inner race 230 and an outer race 235. Interfacial spaces 245 between the balls 220, the retainer 225 and the inner and outer races 230, 235, are filled with a lubricating fluid or grease to facilitate movement of the balls 220. The structure of the ball bearing or similar bearing is not material to the invention. What is significant is that the seal adjacent the ball bearing must maintain its sealing function so that the fluid, grease and other loose particles associated with the ball bearings cannot reach the discs.

As spindle rotational speeds increase, it becomes increasingly more difficult for ferrofluid seals to retain fluid in the seal gaps without migration and splashing. In addition, the seal conductivity of ferrofluid seals is becoming marginal (>150 Mohms) for high performance drives. Therefore, a capillary seal, of the type used in FDB motors, could be used to replace a ferrofluid seal. In addition, the electrical conductivity of FDB motors has been found to be on the order of 100 Mohm or less. This can be attributed to the very small gap.

Two types of capillary seals were evaluated, centrifugal and straight. Centrifugal seals are being used successfully in the conical motors, but are more complicated than straight capillary seals. The seals are shown in FIGS. 3A, 3B, 4A, and 4B. Both types are predicted to offer adequate sealing strength (>5 in $H_2O$ at 14000 rpm). The centrifugal seal (FIG. 4) derives its strength from rotation, while the straight capillary (FIG. 3) seal is a static seal.

Both seal types were configured to be direct drop-in fits to existing motor designs using convention ball bearings to support relative housing/shaft rotation.

Figure 3A:
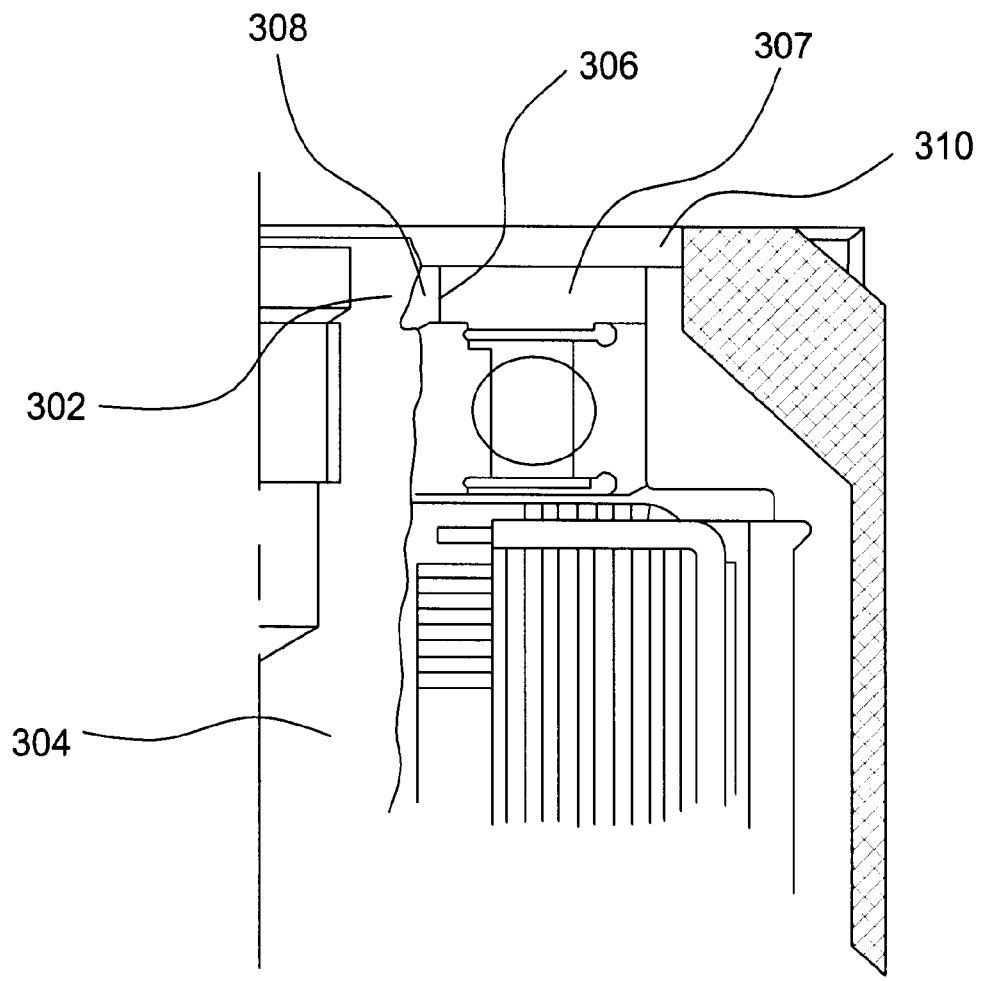
FIGS. 3A and 3B are partial sectional views of the upper section of the spindle motor of FIG. 2 showing an embodiment of the ferrofluid seal according to the present invention.
Figure 3B:
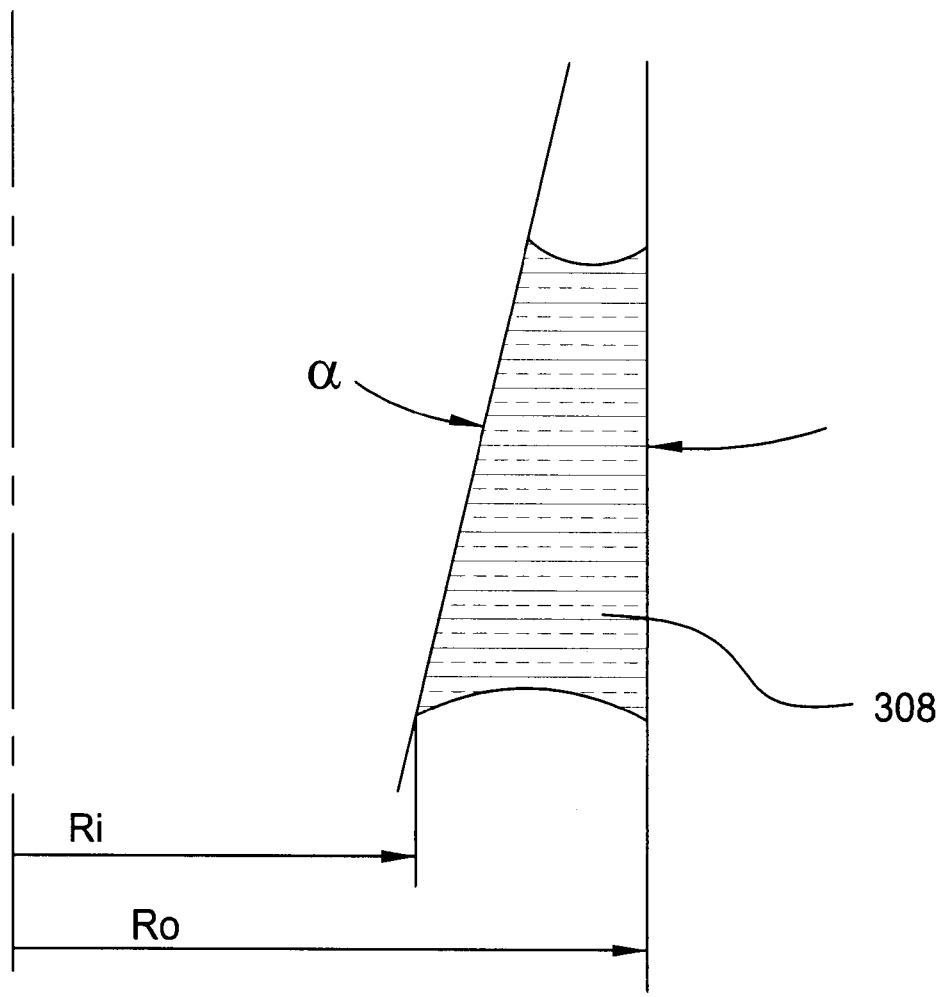

The straight capillary seal is shown in FIG. 3A, with a more detailed version shown in FIG. 3B. As it appears in FIG. 3A, the straight capillary seal comprises simply a tapered surface 302 which is preferentially ground into the external surface of the shaft 304 facing a relatively axially straight surface 306 supported from a shoulder 307 across a narrow gap of about 0.01–0.02 micron. A fluid 308 fills this gap and both seals the gap and provides the necessary conductivity between the housing or hub 310 and the shaft 304 to discharge any static electricity so that no static electricity builds up on the surface of the disc supported on the hub 310. A theoretical analysis has been made of the straight capillary seal using the equation shown below and assuming an operation at 14000 rpm.

Basic formula:

$$\Delta p = 2 \cdot \sigma \cos \theta / (r_o \ldots r_i)$$

σ=oil surface tension(n/m)=30e−3
θ=angle of meniscus=40 deg (0 deg for clean surface and 80 deg for Nyebar)
ri,ro=inner and outer radii of annulus
α=5°

The 5 degree taper on the straight capillary seal should preferably be on the shaft, not on the seal. It could be ground into the shaft. The seal is, therefore, easier to make. The oil is also less influenced by centrifugal force.

Results of this analysis will appear in Table I below following a discussion of the centrifugal seal. The centrifugal seal proposed for this design is shown in FIGS. 4A and 4B.

Figure 4A:
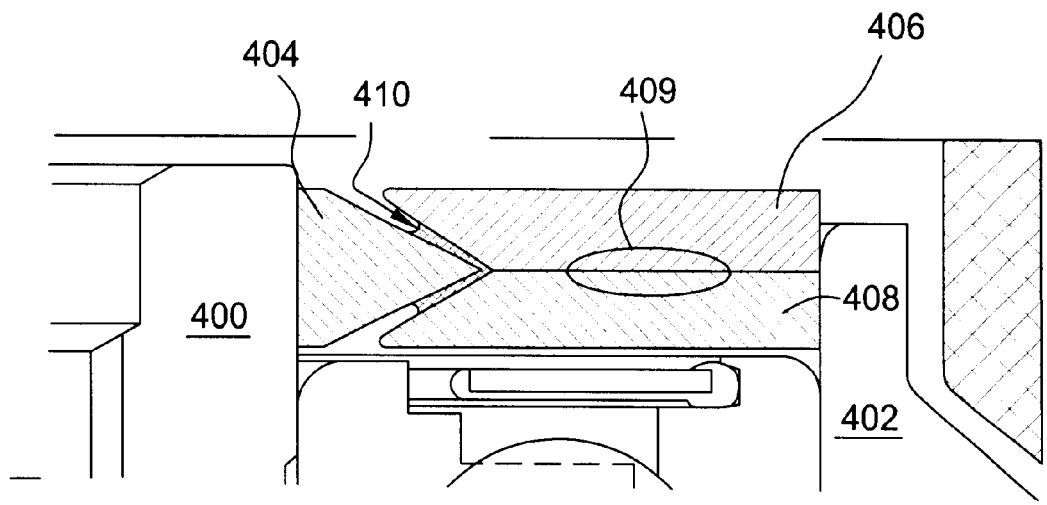
FIGS. 4A and 4B are partial sectional views of a capillary seat in accord with this invention.
Figure 4B:
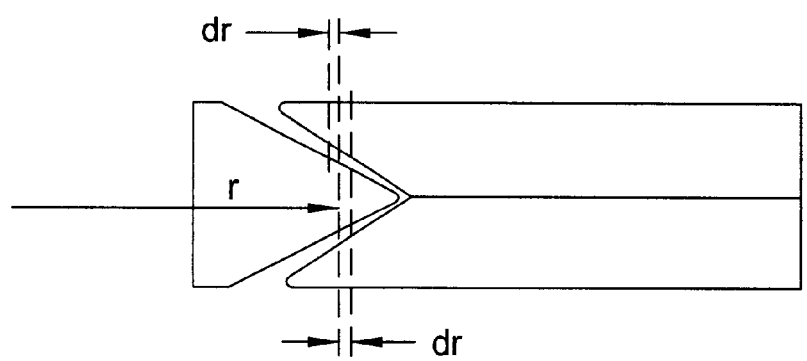

As clearly appears in FIG. 4A, the centrifugal capillary seal 400 is dropped or pressed into place between the shaft 400 and the housing or hub 402. The seal consists simply of a cone 404 which is pressed onto the outer surface of the shaft 400, and typically a female cone consisting of upper and lower pieces 406, 408. In order to achieve adequate seal alignment during installation, the male and female cones are typically of the same axial thickness. They are simultaneously pressed onto or into shaft and hub so that the top surfaces on each part are in the same plane. In a preferred assembly approach, it may be necessary to first insert the lower section 408 of the female cone either before or simultaneously with male cone piece 404. Then the upper female cone piece 406 is pressed into place, and the two pieces 406, 408 are adhesively bonded, welded, or otherwise fixedly joined together. The fluid 410 can then be inserted by capillary attraction or other known process. It is immediately apparent that the need for the bond or weld 409 between the upper/lower pieces 406, 408 is to prevent the escape of any of the fluid between the upper and lower pieces as well as to maintain alignment of the seal elements.

The conical configuration was analyzed as a replacement for a ferrofluid seal at 14000 rpm using the equation and constant set forth below.

The governing equation is:

$$dp/ds = (dp/dr)\cos\theta = 2(\rho\omega)\cos\theta$$

where: dp/ds=pascals/mm
r=radius=4.1 mm
θ=seal cone average angle=30 deg
ρ=density 0.85 g/cc
ω=14000 rpm As described above, both seal types are configured to be direct drop-in fits to existing motor designs such as shown in FIG. 2 using conventional ball bearings.

In both cases, the intent is that the seal contacts the outer race of the ball bearing. In the case of the straight capillary seal, the sleeve element or hub extension 310 is pressed flush against the outer race. In the case of the conical or centrifugal seal, the lower conical element 406 is pressed flush with the top of the rotating element or race. Both seals may be filled by capillary attraction.

| Seal Type | Stiffness gradient (in H₂O/min) | Pressure Capacity (in H₂O) | Volume (μl) |
|---|---|---|---|
| Centrifugal | 52 | 13 | 2.19 |
| Straight (0.01 gap) | 29 | 7 | 0.32 |
| Straight (0.02 gap) | 16 | 4 | 0.45 |

The analysis described above was formed to establish basic geometry and performance capability. The conical seal, although more complex to insert and assemble, and possibly subject to higher electrical resistance due to larger gaps, may hold more oil which is beneficial to long life.

Figure 5:
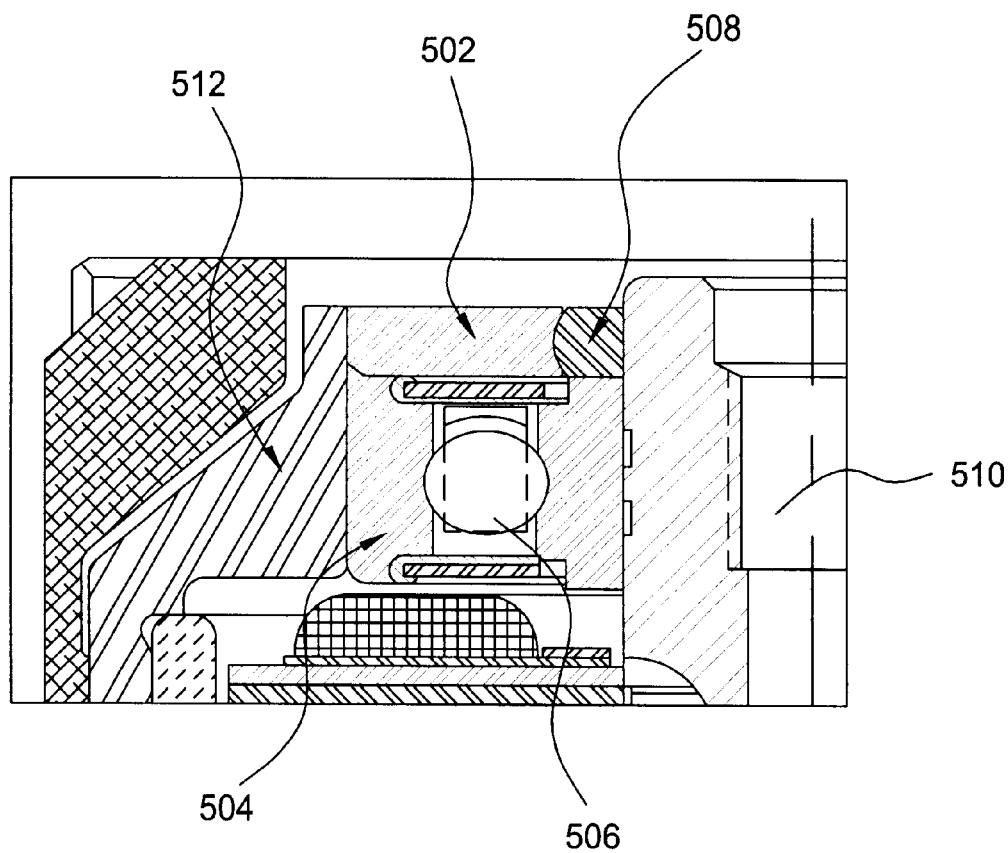
FIG. 5 is a vertical sectional view of an alternate embodiment of the invention.

A further alternative is shown in FIG. 5. As shown in this figure, a spherical seal housing 502, which rests upon the outer race 504 of the ball bearing generally shown at 506, cooperates with a generally spherically surfaced seal ball or ring 508 which is supported from the shaft 510 to create a conductive motor seal, which provides both a ground for the hub and back iron combination generally referenced 512, and additionally prevents airflow through the motor.

The use of a conductive oil both between the region of the stationary seal ball 508 and the spherical seal housing 502 and the upper surface of the inner race 512 prevents particles from exiting from the bearing or the motor through the air gap, with the spherical air gap between the seal ball 508 and the seal housing 502 also being filled with fluid. The seal is formed especially with the housing and ball having different radiuses of curvature, preferably with the housing having a larger radius. It is believed that two forces maintain the integrity of the seal. First, the generally spherical shape of the seal causes the fluid to be restrained by the centrifugal forces. Secondly, the differing part radius allows for capillary forces to restrain the fluid under static conditions in the region 515 between the spherical ball 508 and the spherical housing 502. This design offers a number of advantages including that the spherical seal (and the conical seal also described with respect to FIG. 4) offers better splash protection than either a straight conductive or ferrofluid seal. Further, with respect to this specific design of FIG. 5, the single-piece housing prevents fluid migration better than a multi-piece housing design such as found with the design of FIG. 4.

It is also noted that the nonmagnetic nature of the fluid and seal design allows for reduction in installation constraints and frees boundary conditions. The nonmagnetic nature of the design also allows for greater selection of seal materials. Finally, the increased fluid contact area reduces seal resistance versus current HDD seals.

Figure 6:
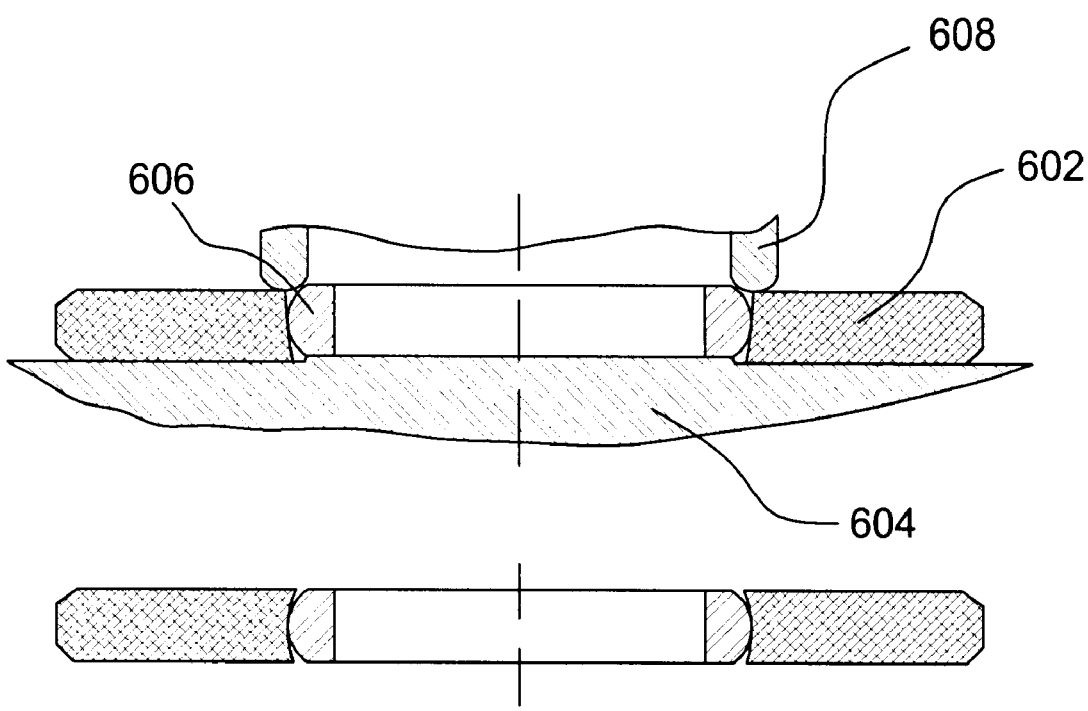
FIG. 6 illustrates a method of assembly of the design of FIG. 5.

The seal FIG. 5 could be formed by several methods, shown in FIGS. 6, 7 and 8. In the assembly process of FIG. 6, the raw seal housing 602 is held in place on an offset fixture 604. A hardened seal ball 606 which will later be slipped over the shaft, is then used as a male side of a stamping operation. An upset press 608 is used to force the seal ball into place within the housing 602, after which the assembly comprising seal ball 606 and housing 602 are slipped over the shaft and pressed against the upper ball bearing and specifically against the outer radius thereof, as shown in FIG. 5.

Figure 7A:
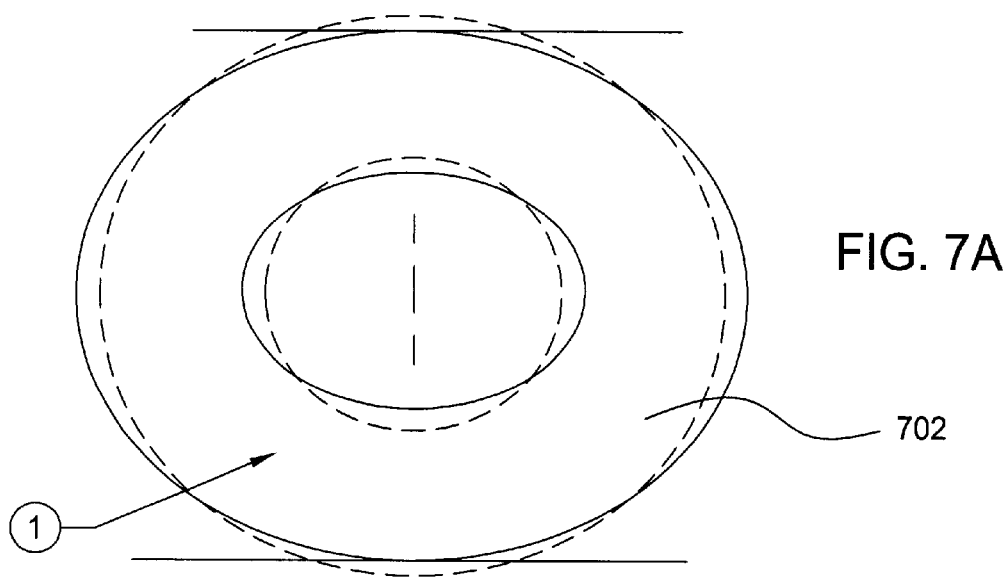
FIGS. 7A–7C illustrates a further assembly method utilizing deformation of parts.
Figure 7B:
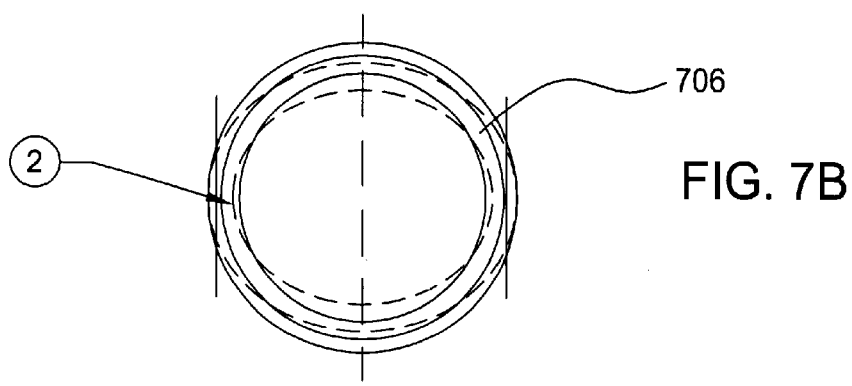
Figure 7C:
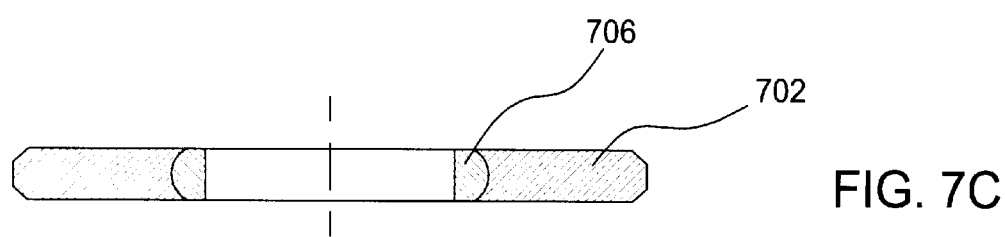

An alternative approach shown in FIGS. 7A–7C would be to plastically deform the two parts, housing and seal ball into ellipses. Orienting the parts such that the narrowest part of the ball 706 (FIG. 7B) aligns with the widest section of the housing 702 (FIG. 7A) allows the parts to be merged into the combination shown in FIG. 7C. The compressive forces that would then be removed with the two parts rotated into their final configuration, and ready to be slipped over the shaft and against the ball bearing race as described previously.

Figure 8A:
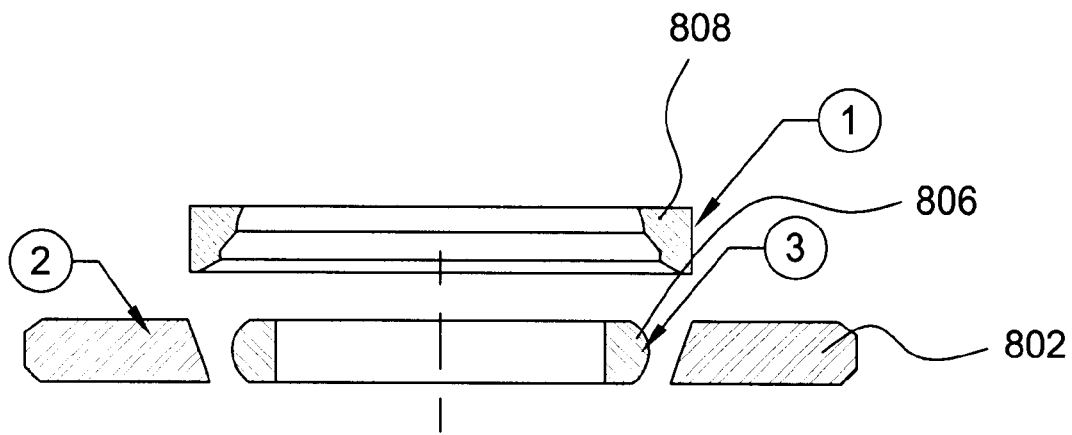
FIGS. 8A–8C illustrates further assembly methods utilizing multiple parts.
Figure 8B:
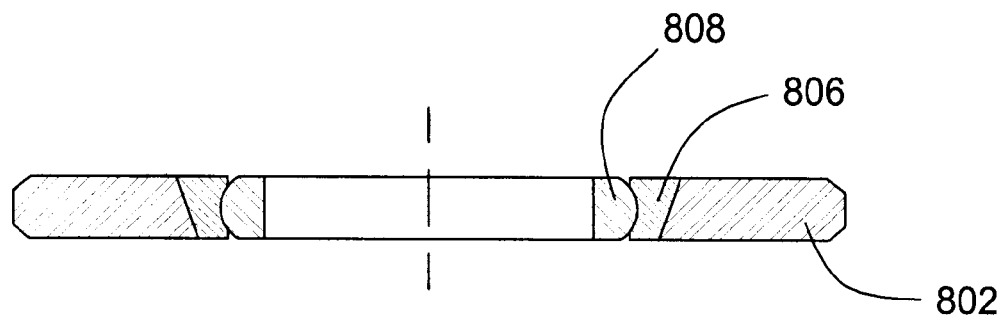
Figure 8C:
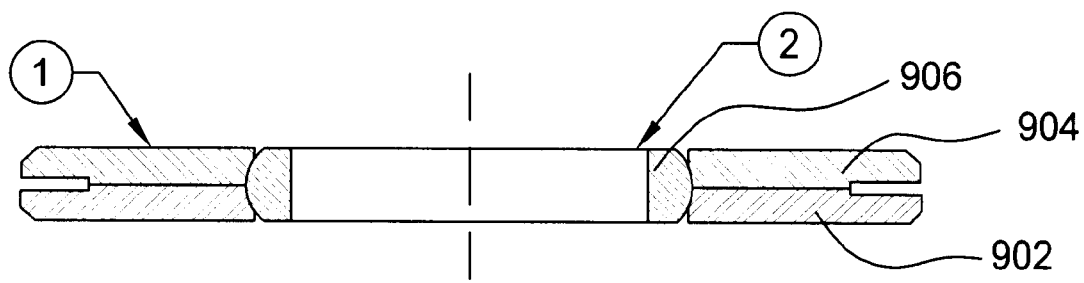

A final approach is as shown in FIGS. 8A and 8B, wherein the housing 802 as provided has a substantially greater inner radius than the outer radius of the seal ball 806. A third inner housing piece 808 is forcibly compressed (FIG. 8B) into the region between their inner radius of the housing 802 and the outer radius of the seal ball 806 providing the substantially same configuration as shown in the above figures, especially FIG. 6. In yet another alternative, a two-part housing (FIG. 8C) substantially similar to the approach of FIG. 4 could be utilized, with upper and lower housing pieces 902, 904 joined to hold the seal ball 906 in place.

Yet another problem needing to be solved with respect to this invention is optimizing the conductive path between the inner and outer elements of the design.

Spindle motors for use in HDD assemblies require an electrical conduction path between the motor hub and drive base. This conduction path is used to "bleed-off" static charge buildup on the discs as they are rotated. Static charge buildup on discs is known to cause performance degradation and failure of recording heads.

Up to this point, the static charge has been bled-off through a ferrofluid seal placed between the motor shaft and the disc mounting hub. A typical ferrofluid seal application is shown on the right side of FIG. 1. Present ferrofluid seal technology can provide an electrical resistance in the range of $10 \times 10_6$ ohm to $20 \times 10^6$ ohm (100–200 Mohm), between the motor hub and shaft. Up to this point, resistance in this range has been sufficient to discharge the static potential without degradation of recording head performance.

Recording heads for the next generation of high performance disc drives are more sensitive to static charge buildup, and therefore require lower grounding resistance between the motor hug and shaft. Specification for next generation drives require 30 Mohm or less grounding resistance.

The resistance value, R, of ferrofluid seal is a function of the fluid resistivity, P, the gap between the seal pole piece and shaft, l, and the surface area of contact between the fluid and shaft, A, by the relation $$R=Pl/A$$

Assembly tolerances, magnetic properties, and fluid chemistry limit the capability of ferrofluid seals to the 100=200 Mohm range. It is understood that a required resistance of <30 Mohm is not achievable without causing serious reliability, cost, and performance degradation in the spindle motor.

Given typical capillary seal geometry and using resistivity values measured in an experimental mode, the resistance of the ground path can be calculated as follows:

measured on Resistivity, $P=1.35 \times 10^9$ ohm·in

Radial Gap, l,=0.0002 inch

Shaft Diameter, d=0.236 inch

Length, L=0.030 inch=area=$\pi dl$=0.0226 in²

R=Resistance=Pl/A=R=$11.9 \times 10^6$=11.9 Mohm

Ferrofluid seals are used to provide a pressure seal to prevent particle contamination in the drive. The current technology in ferrofluid seals is a pressure capacity of 500 Pa. The capillary seal geometry described in this invention is capable of 12,000 Pa pressure capacity, offering improved pressure performance over ferrofluid seal technology, and substantially reduced resistivity.

What is claimed is:

1. A seal for sealing an outer surface of a stationary shaft to an inner surface of a hub supported for rotation about the shaft by at least one ball bearing having inner and outer races affixed to the shaft and hub respectively, the seal comprising:
   - a seal housing having a spherical face facing the shaft, the seal housing resting upon the outer race of the ball bearing;
   - a seal ring supported from the shaft and cooperating with the seal housing; and
   - a capillary seal retained in a gap between the spherical face and the spherically surfaced seal ring for isolating the ball bearing.

2. A seal as claimed in claim 1 wherein the seal ring and the spherical face of the housing each having a different radius of curvature.

3. A seal as claimed in claim 2 wherein the spherical face of the housing has a larger radius than the seal ring.

4. A seal as claimed in claim 3 wherein a conductive fluid is captured between the seal ring and the spherical face of the seal housing.

5. A seal as claimed in claim 4 wherein the conductive fluid is further found between the seal ring and the inner race of the bearing.

6. A seal as claimed in claim 5 wherein the conductive fluid is inserted by capillary action.

* * * * *